United States Patent [19]

Uddgren

[11] 4,396,303
[45] Aug. 2, 1983

[54] IMPROVED BAR CODE AND ALPHA-NUMERIC PRINTER

[75] Inventor: Lars E. Uddgren, Lerum, Sweden

[73] Assignee: Swedot System AB, Goeteborg, Sweden

[21] Appl. No.: 310,198

[22] Filed: Oct. 9, 1981

[30] Foreign Application Priority Data

Oct. 14, 1980 [SE] Sweden ............... 8007172

[51] Int. Cl.³ .............................................. B41J 5/00
[52] U.S. Cl. ..................................... 400/103; 346/141; 101/93.04
[58] Field of Search .................. 400/103, 104–107, 400/154.5; 101/93.04, 93.28, 93.33–93.34; 340/146.32, 146.35; 235/60.11, 60.12; 346/78, 94, 141, 49–50, 56, 105–106; 219/216 PH

[56] References Cited

U.S. PATENT DOCUMENTS

| | | | |
|---|---|---|---|
| 3,702,585 | 11/1972 | Landis et al. | 400/103 |
| 3,820,643 | 6/1974 | Priebs et al. | 400/104 |
| 3,834,506 | 9/1974 | Priebs | 400/104 |
| 3,893,558 | 7/1975 | Fulton et al. | 400/103 X |
| 4,278,018 | 7/1981 | Johannesson | 400/103 |
| 4,302,114 | 11/1981 | Mielke | 400/124 |
| 4,306,817 | 12/1981 | Alas | 400/103 |

FOREIGN PATENT DOCUMENTS

| | | | |
|---|---|---|---|
| 2415214 | 10/1975 | Fed. Rep. of Germany | 400/104 |
| 2535810 | 2/1976 | Fed. Rep. of Germany | 400/104 |
| 2456527 | 8/1976 | Fed. Rep. of Germany | 400/103 |
| 1497201 | 1/1978 | United Kingdom | 101/DIG. 13 |

Primary Examiner—E. H. Eickholt
Attorney, Agent, or Firm—Flynn, Thiel, Boutell & Tanis

[57] ABSTRACT

A printing device adapted to print a bar code on a moving information carrier, preferably in the form of a label for marking an article or packaged goods, said bar code consisting of a plurality of parallel bar imprints of different widths separated by spacings lying therebetween. The invention is characterized in that there is provided one single printing member for all of the bar imprints of the bar code, the imprint width of said printing member being not greater than the smallest width of any bar imprint appearing in said bar code, and said printing member being operatively connected to an actuating unit coupled to a programmable control unit, which is adapted to generate control signals at small enough time intervals to form bar imprints of larger width by juxtaposing of bar imprints of the width of said printing member without intervening spacings. The use of only one single printing member not only results in a considerable structural simplification, but also permits the printing device to be universally employed for any existing and future bar codes, the narrowest bar imprints of which correspond to the imprint width of the printing member. The narrow printing member produces a sharply defined and accurately readable imprint also for bars of larger width.

6 Claims, 7 Drawing Figures

IMPROVED BAR CODE AND ALPHA-NUMERIC PRINTER

FIELD OF THE INVENTION

The invention relates to a printing device for printing on a moving information carrier a bar code which includes a plurality of parallel bars of different widths.

BACKGROUND OF THE INVENTION

From German Offenlegungsschrift No. 21 45 116, which corresponds to U.S. Pat. No. 3,820,643, there is known a printing head for combined alphanumerical characters and/or code symbols, wherein two printing bars with printing surfaces of different widths are provided for printing the bar code. The printing bars are mounted within a housing of the printing head in sliding engagement with one another and adapted to be actuated independently of one another by means of two reciprocating solenoids. Each printing bar serves for printing a bar of predetermined width, so that the printing head is suitable only for printing a bar code having bars of two different widths. This printing head is relatively bulky, as each printing bar has to be provided with a separate actuating solenoid, the strength of which has to be selected in accordance with the respective bar width. Another disadvantage results from the two printing bars being in sliding engagement with one another. Moreover the imprint of the larger-width printing bar tends to become blurred due to the lower pressure per unit of area.

A printing head known from German Offenlegungsschrift No. 24 15 214 also comprises two printing bars guided adjacent one another within a cylindric housing and adapted to be actuated by solenoids, with the two printing bars contacting one another adjacent their free ends. The free ends of the printing bars each carry a bar printing type of different width corresponding to two imprint widths of the bar code to be printed. In addition to their individual actuation, the printing bars may be simultaneously actuated for printing a bar the width of which corresponds to the sum of the imprint widths of the two printing bars. The wider printing bars tend to produce somewhat blurred imprints. Aside from the rather bulky construction with two actuating units and the corresponding return means, this embodiment suffers from the disadvantage that its employ is restricted to a bar code with predetermined bar widths numbering no more than three. A further disadvantage results from the frictional engagement between the two printing bars, at least adjacent their free ends, whereby the quality of the resulting imprints is further reduced.

From German Offenlegungsschrift No. 22 16 967, which corresponds to U.S. Pat. No. 3,834,506, there is also known a printing head comprising two printing bars guided parallel to one another within a housing and provided with bar printing types at their forward ends. This embodiment suffers from the same disadvantages as explained above, in that its employ is also restricted to the printing of a bar code having bars of only three predetermined widths, and in that the printing bars are in frictional engagement with one another. This printing head is thus unsuitable for printing a bar code having bars of variable width or more than three different bar widths. The structural dimensions of a printing head employed for printing a bar code are of considerable importance, inasmuch as the printing head is usually employed in connection with a needle printing device for printing alphanumeric characters. In the case of labels or similar information carriers, it is desired that the printed information be arranged with the highest possible density, i.e. as closely above one another as possible, as seen transversely of the direction of movement of the information carrier. As the needle printing device requires a rather complicated mechanical structure and actuation of the printing needles should be substantially linear without any reversing points, the structure of the printing head should be as compact as possible, so that the mechanism of the needle printing assembly remains simple and effective, and so that the printed information can be arranged in the smallest possible area.

It is an object of the invention to provide a printing device of the type set forth in the introduction, which consists of the smallest possible number of components and is of lightweight and compact construction, while being adapted to be employed for printing bar codes of any type, i.e. bar codes having selectively variable bar widths and/or selectively any number of different bar widths, and which produces a particularly high quality of the printed bar code.

SUMMARY OF THE INVENTION

This object is attained by providing a printing device of the specified type which includes a single printing member for all of the bar imprints of the bar code, the imprint width of a printing surface of the printing member being not greater than the smallest width of any bar appearing in the bar code, the printing member being operatively connected to an actuating unit which in turn is coupled to a programmable control unit, the control unit being adapted to generate control signals at small enough time intervals to form bars of larger width by juxtaposing imprints of the printing surface without intervening spacings. The single printing member with its actuating unit is of compact construction and can be readily combined with a needle printing mechanism or a similar printing device for printing alphanumeric characters. The single printing member can be very accurately guided. Due to its small width, it produces sharply defined and accurately readable imprints even in the case of bars of larger width. As the printing member always strikes with the same specific surface pressure, the imprints of the narrower bars as well as those of the bars of greater width are of a uniformly high quality. The individual imprints for the bars of greater width will, due to a slight diffusion of the printing ink on either side of every individual bar imprint, be located adjacent one another with no intervening spacings at all. The printing mechanism for the bar code consists of very few components. It may be employed for printing any type of bar code consisting of bars of different widths. Operation of the printing mechanism is, moreover, independent of the number of different bar widths appearing in a bar code. It is only required that the width of the printing member be not greater than the width of the narrowest bar appearing in the respective bar code. All bar imprints of greater width may be formed by juxtaposing an appropriate number of bar imprints having the width of the printing member. The control unit permits the spacings between the bar imprints to be adjusted between zero and practically any width, so that the printing device can be suitably employed for any known bar code as well for any code possibly emerging in the future.

An advantageous embodiment of the invention includes at least one row of printing needles adapted to be employed for printing the text in clear of the bar code in the form of alphanumeric characters and for printing an additional text consisting of alphanumeric characters on the information carrier, one group of the needles, which prints the text of the bar code, being located beyond and a further group of the needles being located within the lengthwise extent of the printing surface, so that the alpha-numeric characters of the further text can be printed by at least one of the first and further groups of needles adjacent the bar code in the direction of movement of the carrier and within a range defined by the combined heights of the bar code and the text thereof.

The use of only a single flat printing member permits said printing member to be located closely adjacent the printing needles, as by locating the actuating unit for the printing member rearward of the printing needle mechanism, so that the necessary information is printed on the information carrier within an exceptionally narrow area defined by the height of the bar code plus the height of the text in clear, the latter being immediately above or below the bar code. This offers the desirable possibility to accommodate all of the necessary information in the smallest possible area. A further advantage is the relatively low energy consumption of the printing device, resulting from the fact that printing of the bar code and the associated text in clear is finished before starting to print the further information in alphanumeric form.

An advantageous embodiment includes the printing member being movably supported by two leaf springs which extend generally perpendicular to the direction of movement of the printing member, each leaf spring having one end connected to the printing member and its other end attached to a stationary member. This is advantageous for keeping the moving mass for printing the bar code as small as possible and for ensuring that the printing member is smoothly and accurately guided. It also results in a simple and compact construction offering an advantageously low resistance to the movement of the printing member, which is of particular importance, as the movements of the printing member are carried out at exceptionally high speeds, i.e. as the printing member has to be rapidly accelerated and its direction of movement as rapidly reversed.

A further advantageous feature includes the printing member being a spring steel strip having a thickness substantially equal to the narrowest bar of the bar code, an end of the strip forming the printing surface and at least one lateral edge of the strip being bent to extend at an angle with respect to the main plane thereof. This configuration of the printing member results in very small inertial forces, and moreover in low production costs, as it permits the printing member to be cut or stamped from a commercially available spring steel strip. Its end face employed for printing does not require an insert or a particular type bar as conventionally employed in the prior art, instead of which is merely needs to be ground flat. The thickness of the spring steel strip corresponds to the narrowest bar imprint. The upwardly angled edge of the spring steel strip, which does not of course extend up to the printing surface but rather ends short of it, conveys the necessary stiffness to the printing member without significantly increasing its mass. It is obvious that the printing member requires exceptionally little space within the printing device, so that it might even be disposed between the printing needles. In addition, its forward end portion employed for printing can be very accurately guided, thus enhancing the quality of the printed bar code.

Of importance finally is an embodiment which includes the actuating unit having a rotary solenoid, the operative angle of which is limited by a stop member, and which is coupled to the printing member by an articulated linkage. This takes account of the fact that the printing member is employed for printing all of the bars of the bar code, to which effect it has to be moved at higher speed and more frequently than the plural printing members employed in prior art devices. It has been found that a rotary solenoid is particularly well suited for this purpose, as it is able to perform accurately reproducible movements with a very short stroke and additionally ensures constant response properties and an unvarying actuation force. In addition, the rotary solenoid is of considerably more compact construction than the hitherto employed linear-stroke solenoids. The rotary solenoid thus also contributes to the compact overall construction of the printing device. Particularly suited for printing on EAN bar code employing the narrowest bar width is a rotary solenoid sold by the Swedish company FACIT under the Model No. 15,011 000 - 00/5.

BRIEF DESCRIPTION OF THE DRAWINGS

An embodiment of the invention shall now be described with reference to the accompanying drawing, wherein.

DETAILED DESCRIPTION

Figure 1:
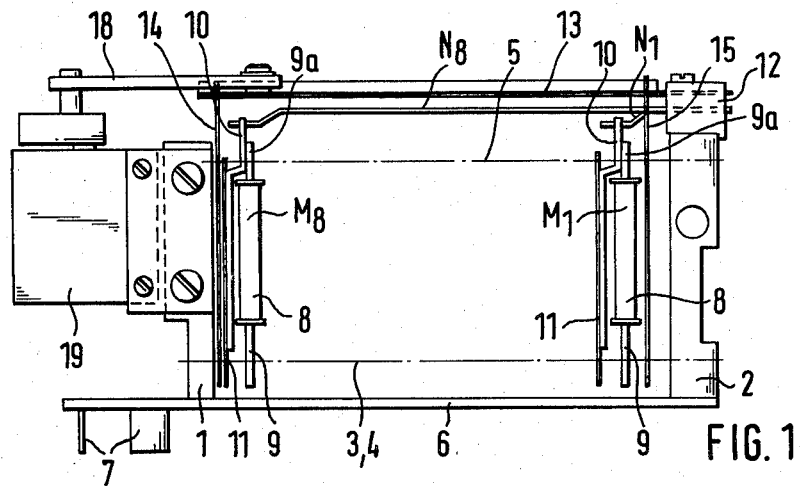
FIG. 1 shows a partially sectioned bottom view of a printing device according to the invention.
Figure 2:
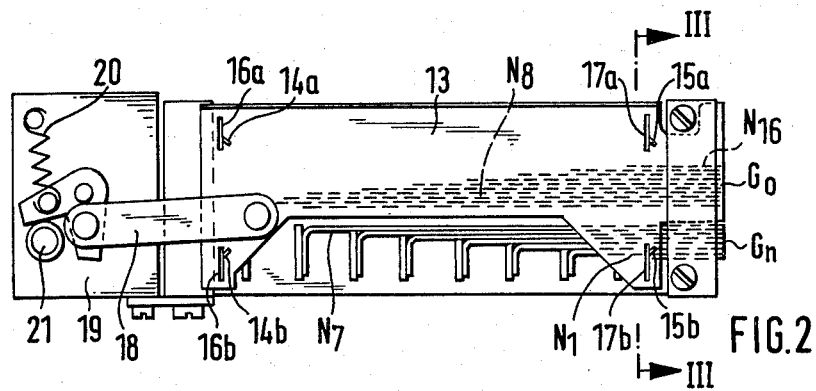
FIG. 2 shows a side view of the printing device of FIG. 1.
Figure 3:
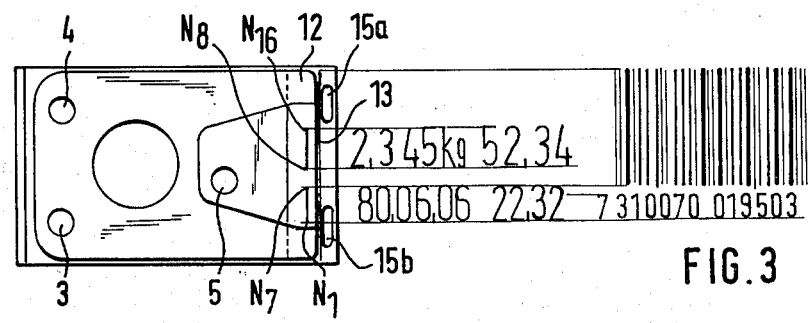
FIG. 3 shows an end view of the printing device of FIG. 1 together with a printed information carrier.

The printing device according to FIGS. 1-3 has a housing formed by two end wall plates 1, 2, which are interconnected by means of three parallel axles 3, 4 and 5. An electronic circuit board 6 containing electrical engraved conductors, not shown here, is attached to the two end wall plates 1 and 2. The circuit board 6 also has a connection terminal part 7 for electrical connection to an electronic control A (see FIG. 7). On the axles 3, 4 and 5 two rows of electro-magnets or solenoids $M_1$-$M_{16}$ are attached, one row being right on top of the other. Each row thus contains eight solenoids, of which only the two solenoids $M_1$ and $M_8$ are shown in FIG. 1. The design and mutual position of the solenoids are in accordance with Swedish patent application No. 7806984-6, which corresponds to U.S. Pat. No. 4,302,114, for which reason only the details that are essential for the present invention are shown here. Each solenoid thus has a magnetic core 9 provided with an excitation winding 8, said core consisting of one leg 9 of a U-shaped core plate of soft iron material (the other leg 9' of which is not visible in this view), whereby the axles 3 and 4 go through the yoke portion (not shown in the Figures) of said U-shaped core plate. An armature plate 10 of soft iron material co-acts with the core 9 of every solenoid $M_1$–$M_{16}$, said armature plate 10, when the excitation winding 8 is currentless, being kept at a distance from the pole end 9a of the solenoid by means of the action of a spring tongue 11 fixed to the armature plate, the free end of said spring tongue being attached on the axle 3. When excitation current is flowing through the winding 8, the armature plate 10 is brought to move, against the action of the spring tongue 11, into contact with the pole end 9a of the solenoid.

In accordance with the printing device described in said Swedish patent application No. 7806984-6, every solenoid unit consisting of the U-shaped core plate 9, 9', the windings 8, 8', a couple of armature plates 10, 10' and the spring tongues 11, 11' forms two single control solenoids, for example $M_1$ and $M_9$, $M_2$ and $M_{10}$ etc., which work independently of each other.

The printing device according to the present invention has, as mentioned earlier, two groups of eight control solenoids each, whereby the solenoids $M_1$–$M_7$ (only $M_1$ is shown in FIG. 1) in the lower row actuates printing needles $N_1$–$N_7$ respectively (only $N_1$ is visible in FIG. 1, whereas FIG. 2 shows all printing needles $N_1$–$N_7$) of a lower group $G_n$ of seven needles, whereas the solenoid $M_8$ in the lower row together with all solenoids $M_9$–$M_{16}$ in the upper row actuates printing needles $N_8$, $N_9$–$N_{16}$ in an upper group $G_o$ of nine needles.

Every needle $N_1$–$N_{16}$ in the two groups $G_n$ and $G_o$ is, at its front end, guided in a groove in a guide plate 12 attached to the end wall plate 2, which guide plate is located closely to the surface intended for printing, in this case a self-adhesive label for marking an article or article package with the last consumption date, net weight, compare price, end price and further information, if any. The excitation windings 8 of the control solenoids are, via not shown electrical conductors in the circuit board 6 and the connection terminal 7, in a way known per se, connected to the electrical control unit A (shown in FIG. 7) for producing printed information consisting of alpha-numeric characters in two lines built up by dots, in synchronism with the feed of the information carrying surface.

The printing of the bar code on the label is, according to the invention, carried out by means of one single, platelike printing member 13. This platelike printing member 13 is in the embodiment according to FIGS. 1–3 displaceably arranged parallel to the two groups $G_n$ and $G_o$ of printing needles $N_1$–$N_{16}$. The printing member 13, which preferably is of stainless spring steel and in this case 0.3 mm thick and approximately 20 mm wide, is supported almost friction free in the printing device by means of two leaf springs or tongues 14, 15 also of spring steel, fixed to the printing member 13, each said tongue having one end attached to the axles 3 and 4. Through this the printing member 13 will, in a very uncomplicated way, be accurately guided in directions perpendicular to the direction in which said member is displaced. The printing end of the printing member 13 is arranged to run easily between two plane, teflon covered plates attached to the end wall 2. The printing member 13 can very easily be attached to the spring tongues 14 and 15 by lugs on the two free ends 14a, 14b and 15a, 15b of the respective tongues being guided into and through slots 16a, 16b and 17a, 17b in the printing member 13 and then being bent. These joints are then preferably covered by a small pad of silicon resin or other resilient material so as to increase the flexibility and reduce the wear. The back and forth displacement of the printing member 13 towards the surface to be printed upon is, in the printing device according to the invention, preferably carried out via a link bracket 18 by means of a fast, relatively strong rotary electro-magnet 19 fixed to the end wall 1 of the device. The displacement of the printing member 13 towards the surface to be printed upon takes place when the rotary electro-magnet 19 is energised, against the action of a spring 20 and toward a stop 21.

The excitation winding of the rotary electro-magnet 19 is via not shown electrical conductors connected to the same electronic control unit A as the control solenoids $M_1$–$M_{16}$ for printing a bar code according to prevalent standards, for example the EAN code or UPC code, in synchronism with the feed of the information carrying medium to be printed upon. Said control unit, which in principle is a micro-processor or micro-computer, is preferably programmed in such a way that simultaneously or synchronously with the energisation of the rotary electro-magnet 19 for printing said bar code on the information carrier, the first five control solenoids $M_1$–$M_5$ will be selectively energised for printing a "text en clair" (Klarschrift) corresponding to the bar code text closely below the bar code, also according to the prevalent standards. Text "en clair" means text in clear, or in other words alpha-numeric characters which people can read more easily than bar codes.

The control unit A is further programmed in such a way that, after the bar code and the corresponding "text en clair" has been printed, the control solenoids $M_1$–$M_{16}$ are selectively energised for printing alpha-numeric characters on the information carrier, for example information in "text en clair" (Klarschrift) of the last consumption date of the article in question, net weight, kilo price and end price, preferably on two lines.

The compact position of the printing member 13 relative to the needles $N_1$–$N_{16}$ and the specific programmed control of these elements from the electronic control unit as described above makes it possible to efficiently take advantage of the usually very limited space on a label that is available for printing.

The printing device according to the invention has also the advantage that the total electrical power needed for printing a combined bar code and alpha-numeric characters so as to produce a complete information content on a label will be low, since the printing of the bar code and corresponding "text en clair", and the printing of the alpha-numeric characters takes place one after another, and not simultaneously as in the prior art systems.

The printing device according to the invention has the main advantage over the prior art system that it utilizes *only one single printing member* for printing a bar code easily readable by so called bar code scanning devices.

In the shown embodiment of the invention, the bar code and the alpha-numeric text on the information carrier, for example a label, is carried out by the printing member 13 and the needles $N_1$–$N_{16}$ being stamped against an ink ribbon and the label positioned behind said ribbon on a printing bed.

Figure 4:
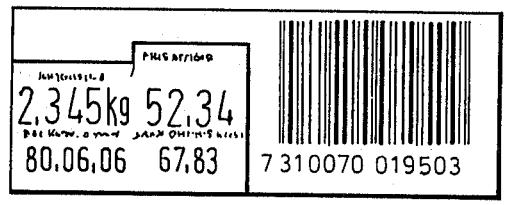
FIGS. 4, 5 and 6 show various embodiments of labels printed by means of the printing device according to the invention.
Figure 5:
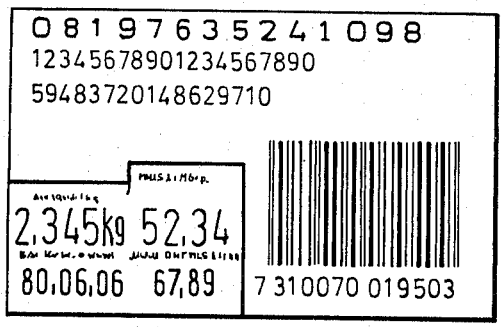
Figure 6:
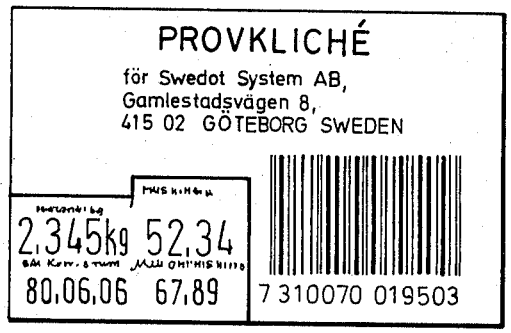

FIGS. 4, 5 and 6 show by way of example three different labels which can be produced by the printing device according to the invention.

FIG. 4 shows a label which has been produced by only the printing device in accordance with the invention.

FIG. 5 shows how it is possible to combine the basic information in FIG. 4 produced by the printing device according to the invention with a text consisting of three further lines of alpha-numeric characters produced by a printing device according to the above-mentioned Swedish patent application No. 7806984-6 utilizing three times five, equal to fifteen, needles for printing three further lines of alpha-numeric characters on the label.

FIG. 6 shows how it is possible to combine the basic information in FIG. 4 with a text produced by means of a rubber cliche.

Figure 7:
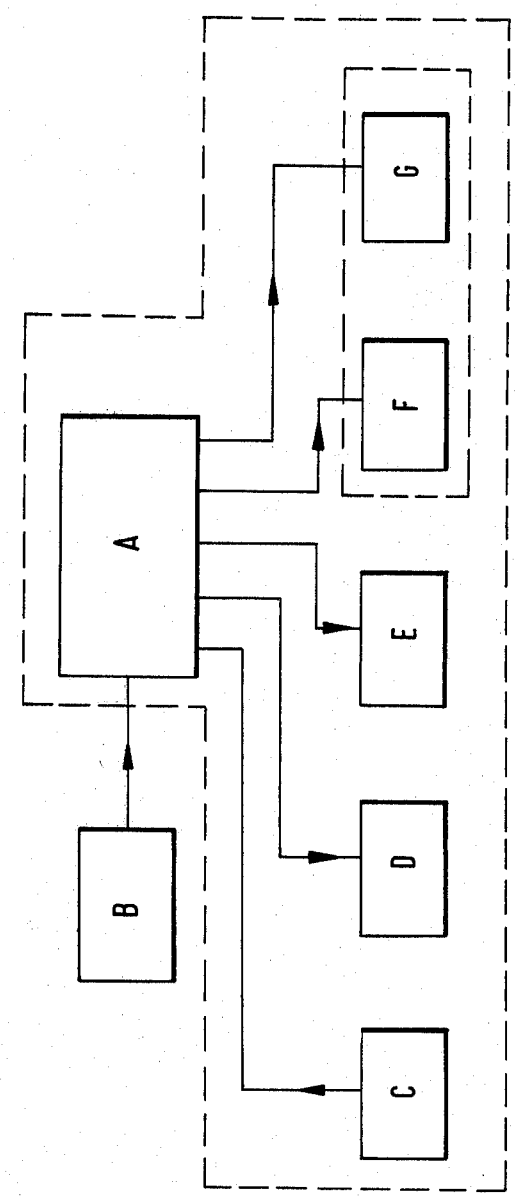
FIG. 7 shows a block diagram of a system in which a printing device according to the invention is incorporated.

In FIG. 7, block B can for example be an electronic weighing, calculating and information storing unit which supplies appropriate numeric and alpha-numeric information, for example, the number of a supplier for the article in question, article number, weight, price per unit of weight, and total price, in the form of electrical digital signals, to a control unit A in the printing device, which in this shown case works as a so called slave printer.

In the electronic control unit A, a programmed micro-processor known per se, in this particular case a Motorola MC 6802, primarily serves as character generator for converting or translating said numeric and alpha-numeric information in the form of digital signals into control signals which are then used to tripper the energisation pulses to the needle actuators $M_1$-$M_{16}$ and to the rotary electro-magnet 19, so as to produce an imprint consisting respectively of alpha-numeric characters and a bar code imprint on the information carrier, which correspond to the information received from unit B outside the printing device.

The micro-processor is programmed to carry out the generation of said control signals on the basis of the information from unit B in such a way that, when the bar imprint on the information carrier is to be a thin line (bar) of modulus width, the control unit A will send out one single short energization pulse to the rotary magnet 19, whereas, when the bar imprint is to be a wider line (bar) of X, let us say three, times the modulus width, the control unit A will send out a pulse train of X, in this case three, short energization pulses to the rotary magnet 19. The intervals between each such short energisation pulse in said pulse train are so small that the single bar printing member 13 will print X, in this case three, lines (bars) of modulus width one after another juxtaposed. Due to a slight diffusion (spreading out) of the printing ink on either side of these X printed individual lines (bars), there will be no intervening spacings at all between them in the imprint.

Block C represents a photo sensor, which serves to generate a signal to the control unit A every time the front edge of an information carrier, for example a label, passes this sensor. This signal is utilized in the control unit A to correctly position the imprint on every information carrier in relation to the front edge of the respective carrier.

Block D represents a motor feeding a printing ink ribbon between the printing ends of the needles $N_1$-$N_{16}$ and printing surface of the bar printing member 13 and the information carrier.

Block E represents a stepping motor for feeding the information carriers, or rather, in the case of said carriers being self-adhesive labels for marking an articles, for feeding a tape on which the labels are applied with small interspacings.

Block F represents the actuators, i.e. solenoids $M_1$-$M_{16}$, for the printing needles or wires $N_1$-$N_{16}$ in FIG. 1, which selectively receive energisation pulses from the control unit A as described in the above.

Block G represents the rotary electro-magnet 19 for the bar printing member 13 in FIG. 1, which also receives energisation pulses from the control unit A as described in the above.

Blocks F and G form together what is usually called the printer head in the printing device, whereas blocks A, C, D, E, F and G constitute essentially the whole printing device.

Block B is an example of a device located outside for printing device and connected to block A, i.e. the control unit, for providing the input data to be printed by the printing device on the information carrier.

The present invention is not limited to the embodiment described above and shown in the drawings, but several modifications are possible within the scope of the accompanying claims.

The embodiments of the invention in which an exclusive property or privilege is claimed are defined as follows:

1. A mechanical impact printing device for printing a bar code on a moving information carrier, said bar code including a plurality of parallel bars of different widths separated by spacings, comprising a single, movable printing member, the width of an elongate printing surface provided on said printing member being not greater than the smallest width of any bar appearing in said bar code, said printing member being operatively connected to an actuating unit which in turn is operatively coupled to programmable control means, said control means generating control signals which cause said actuating unit to effect movement of said printing surface into and out of engagement with said carrier, said control means being adapted to generate control signals spaced by small enough time intervals to form bars of larger width than said printing surface by juxtaposing imprints of said printing surface without intervening spacings.

2. A printing device according to claim 1, further comprising printing means including at least one row of selectively movable printing needles for printing the text of said bar code in the form of alpha-numeric characters and for printing a further text in the form of alpha-numeric characters on said information carrier, one group of said needles, which group prints said text of said bar code, being located beyond and a further group of said needles being located within the lengthwise extent of said printing surface which extends transversely of said direction of movement of said carrier, whereby said alpha-numeric characters of said further text can be printed by at least one of said first and further groups of needles adjacent said bar code in said first direction and within a range defined by the height of said bar code plus the height of said text of said bar code.

3. A printing device according to claim 1, wherein said printing member is a spring steel strip having a thickness substantially equal to the narrowest bar of said bar code, an end of said spring steel strip forming said printing surface, and at least one lateral edge of said spring steel strip being bent to extend at an angle with respect to the main plane thereof.

4. A printing device according to claim 1, wherein said according unit for said printing member includes a rotary solenoid, the operative angle of rotation of which is limited by a stop member, and which is connected to said printing member by an articulated linkage.

5. A printing device adapted to print on an information carrier moving in a first direction a bar code which includes a plurality of spaced, parallel bars of different widths, comprising a single printing member supported for movement toward and away from said carrier and having thereon an elongate printing surface, the width of said printing surface being not greater than the smallest width of any bar in said bar code, actuating means operatively coupled to said printing member for effecting said movement thereof, and control means operatively coupled to said actuating means for generating control signals which cause said actuating means to move said printing surface into engagement with said carrier, said control means being adapted to selectively generate a series of said control signals spaced by time intervals sufficiently small so that the resulting imprints of said printing surface on said carrier are free of intervening spacing, thereby forming a bar having a width greater than that of said printing surface, said printing member being movably supported by two leaf springs which extend substantially perpendicular to the direction of movement of said printing member, each said leaf spring having one end connected to said printing member and the other end attached to a stationary member of the printing device.

6. A mechanical impact printing device adapted to print on an information carrier moving in a first direction a bar code which includes a plurality of spaced, parallel bars of different widths, comprising a single printing member having thereon a single, elongate printing surface extending generally transversely of said first direction, the width of said printing surface being not greater than the smallest width of any bar in said bar code, said printing member being movable relative to said carrier in directions toward and away from said carrier between a first position in which said printing surface is spaced from said carrier and a second position in which said printing surface is adjacent said carrier, said printing member and carrier normally being in said first position, means for producing an imprint of said printing surface on said carrier when said printing member and carrier are in said second position, actuating means for effecting said relative movement of said printing member and carrier, and control means operatively coupled to said actuating means for generating control signals which cause said actuating means to move said printing member and said carrier from said first position to said second position and then back to said first position, said control means being adapted to selectively generate a series of said control signals spaced by time intervals sufficiently small so that the imprints of said printing surface produced on said carrier are free of intervening spacing, thereby defining a bar having a width greater than that of said printing surface.

* * * * *

UNITED STATES PATENT AND TRADEMARK OFFICE
CERTIFICATE OF CORRECTION

PATENT NO. : 4 396 303

DATED : August 2, 1983

INVENTOR(S) : Lars Einar Uddgren

It is certified that error appears in the above-identified patent and that said Letters Patent is hereby corrected as shown below:

Column 8, Line 67; change "according" to ---actuating---.

Signed and Sealed this

Twenty-eighth Day of February 1984

[SEAL]

Attest:

GERALD J. MOSSINGHOFF

Attesting Officer — Commissioner of Patents and Trademarks